United States Patent [19]

Ogata

[11] 3,952,775
[45] Apr. 27, 1976

[54] ELECTROMAGNETIC CHANGE-OVER VALVE

[75] Inventor: Syunshi Ogata, Koshigaya, Japan

[73] Assignee: Shoketsu Kinzoku Kogyo Kabushiki Kaisha, Tokyo, Japan

[22] Filed: Apr. 8, 1975

[21] Appl. No.: 566,088

Related U.S. Application Data

[63] Continuation-in-part of Ser. No. 558,474, March 14, 1975, abandoned, which is a continuation of Ser. No. 395,112, Sept. 17, 1973, abandoned, which is a continuation-in-part of Ser. No. 190,941, Oct. 20, 1971, abandoned.

[52] U.S. Cl. .................... 137/625.38; 137/625.69
[51] Int. Cl.² ................... F16K 11/07; F16K 47/00
[58] Field of Search ............... 137/625.38, 625.64, 137/625.69

[56] References Cited
UNITED STATES PATENTS

| 2,920,650 | 1/1960 | Moog | 137/625.69 |
| 2,973,013 | 2/1961 | Myers | 137/625.62 |
| 3,079,947 | 3/1963 | Hunt et al. | 137/625.69 X |
| 3,270,776 | 9/1966 | Carls | 137/625.64 |
| 3,342,213 | 9/1967 | Walters | 137/625.69 |

Primary Examiner—Henry T. Klinksiek
Attorney, Agent, or Firm—Toren, McGeady and Stanger

[57] ABSTRACT

In a spool-sleeve type electromagnetic change-over valve the dimension of the non-valving holes in the axial direction of the sleeve is made considerably larger than the comparable dimension of the valving holes and the total area of a row of the non-valving holes is similarly made much larger than a row of the valving holes so that the spool stroke is kept small while increasing the air flow capacity of the valve.

5 Claims, 11 Drawing Figures

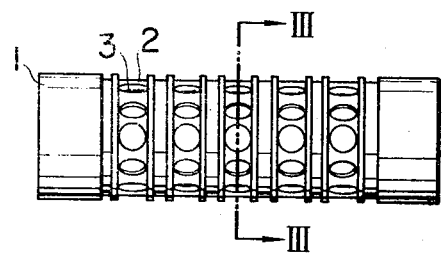
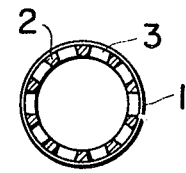
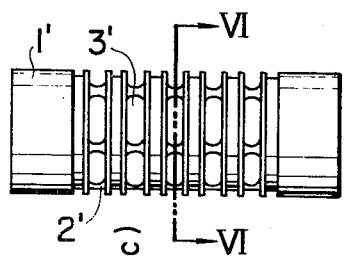
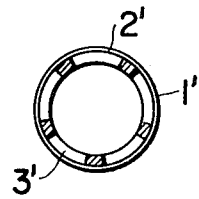
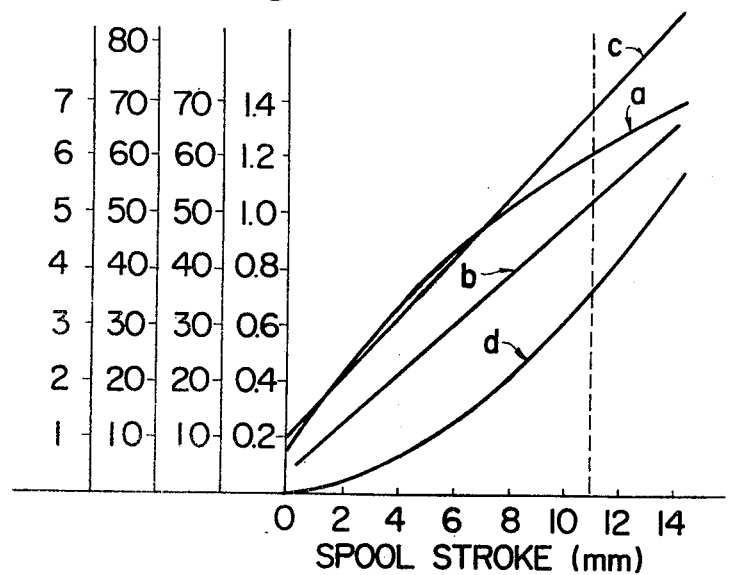

3,952,775

ELECTROMAGNETIC CHANGE-OVER VALVE

This is a continuation-in-part of the co-pending application Ser. No. 558,474 filed Mar. 14, 1975, which was a continuation of co-pending application Ser. No. 395,112, filed Sept. 17, 1973, which was a continuation-in-part of the then co-pending application Ser. No. 190,941, filed Oct. 20, 1971, all now abandoned.

SUMMARY OF THE INVENTION

The present invention is directed to a spool-sleeve type electromagnetic change-over valve and, more particularly, it concerns the dimensions and flow areas of the valving and non-valving holes in the sleeve of the valve.

Basically, an electromagnetic valve is made up of a sleeve and a spool. The sleeve is fixed to the body portion of the valve by an O-ring and the spool, fitted in the sleeve, is moved by an electromagnet for switching the connection of the ports communicating with the valving and non-valving holes in the sleeve.

In conventional spool-sleeve type electromagnetic change-over valves, all of the holes in the sleeve are usually circular in shape and have the same diameter. The primary object of the present invention is to optimize the efficiency of such valves while limiting any increase in cost by varying the size and flow area of the valving holes as compared to the non-valving holes.

In accordance with the present invention, a spool-sleeve type electromagnetic change-over valve assembly is provided in which the holes formed in the sleeve are varied in size and total flow area so that the valving holes which have a direct bearing on the spool stroke are kept small in size and in total flow area relative to the non-valving holes which have no direct relation to the stroke. As a result, the stroke of the spool can be reduced to a minimum or, by maintaining the size of the stroke, the effective air flow through the valve can be appreciably increased. By keeping the spool stroke small, the life of the solenoid in increased and the electrical performance of the valve is improved.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there is illustrated and described a preferred embodiment of the invention.

BRIEF DESCRIPTION OF THE DRAWING

In the drawing:

FIGS. 2 and 3 are, respectively, a front view and a sectional view, taken along line III—III of FIG. 2, of the sleeve of the valve in FIG. 1;

FIGS. 5 and 6 are, respectively, a front view and a sectional view, taken along the line VI—VI of FIG. 5, of the sleeve shown in FIG. 4;

FIG. 7 is a characteristic diagram showing the relationship between the spool stroke and the coil current, electric power consumption, change-over time and energy consumption of the solenoid in a four-way electromagnetic change-over valve;

DESCRIPTION OF THE PRIOR ART

Figure 1:
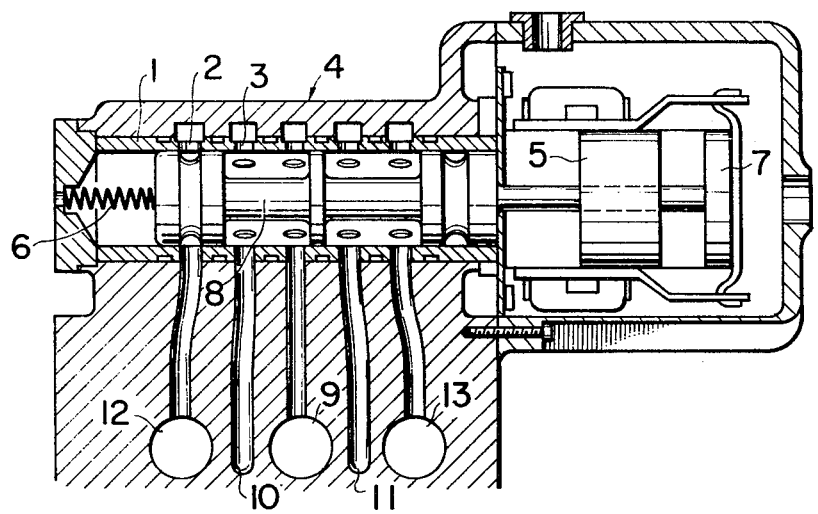
FIG. 1 is a sectional view of a conventional four-way electromagnetic change-over valve.

In conventional electromagnetic change-over valves, for example the four-way electromagnetic change-over valve shown in FIGS. 1 to 3, five equidistantly spaced annular grooves 2 are formed in the center portion of a cylindrical sleeve 1 and a plurality of circular holes 3, all of the same configuration and size, are formed in each of the grooves 2. The sleeve is fixed to a valve portion 4 coaxial with but spaced from a solenoid 5. Slidably fitted in the sleeve is a spool 8 with a spring 6 in contact with one of its ends and a movable core 7 disposed in opposition to the solenoid 5 and located adjacent the opposite end of the spool. The rows of round holes 3 formed through the sleeve 1 in each of the annular grooves 2 are connected, respectively, to a supply port 9, ports 10, 11 and discharge ports 12, 13. When no power is supplied to the solenoid 5, the spool 8 remains in the righthand position, shown in FIG. 1, under the force of the spring 6 with supply port 9 being connected to port 10 and with port 11 connected with one of the discharge ports 13. By supplying current to the solenoid it is energized and attracts the movable iron core and causes the spool 8 to move toward the left, as viewed in FIG. 1, against the force of the spring 6 for changing the connection of the supply port 9 from port 10 to port 11 and the connection of the port 10 from supply port 9 to discharge port 12.

In conventional change-over valves the total area of each row of valving holes is equal to the total area of each of the rows of non-valving holes. The valving holes are the holes in the sleeve over which the lands of the spool pass when there is a change in connection between the ports and the non-valving holes are those holes over which the lands of the spool do not pass. In FIG. 1 the valving holes are associated with the ports 9, 12 and 13 while the non-valving holes are associated with the ports 10 and 11. The dimension of the valving holes in the axial direction of the sleeve determines the stroke or axial travel of the spool, that is the distance the land on the spool travels in effecting a change-over in the flow of fluid medium passing from one row of holes to another. It has been known to use narrow slots elongated in the direction normal to the axis of the spool in place of rows of round holes to limit the axial travel of the spool, however, the total flow area for the slot and the total flow area of the adjacent non-valving holes has always been the same. In forming the sleeve, it is more economical to machine round holes than to form narrow elongated slots.

Further, it has also been known that by shortening the spool stroke it is possible to reduce the energy consumption of the solenoid, to shorten the change-over time and also to minimize the amount of impact suffered and the rise of temperature, so that a longer service life for the valve can be obtained while improving the workability and durability of the valve.

Figure 4:
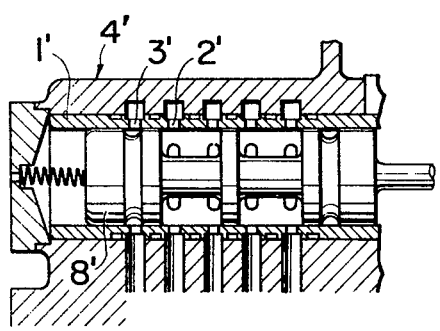
FIG. 4 is a sectional view, similar to FIG. 1, of the essential parts of another conventional four-way electromagnetic change-over valve.

As mentioned above, and as shown in FIGS. 4 to 6, it has been known to provide a cylindrical sleeve 1' which is reduced in length and has a plurality of annular grooves 2' also reduced in width, that is, in the axial direction of the sleeve. Several square or oval-shaped slot-like holes 3', elongated in the direction transverse to the axial direction of the sleeve, are formed in each of the annular grooves 2' and each of these slot-like holes has the same flow passage area. Sleeve 1' is installed in a miniaturized change-over valve body 4' and a miniaturized spool 8' is fitted within the sleeve 1'.

In FIG. 7, the relationship between the stroke of the spool 8' and the coil current $a$, electric power consumption $b$, change-over time $c$ and energy consumption $d$ of the solenoid valve 5 is shown. As will be noted, the coil current $a$ increases parabolically and the electric power consumption $b$ and the change-over time $c$ increase rectilinearly, while the energy consumption $d$ increases while describing a curve of the second order. A 1 mm diminution of the stroke in the vicinity of its 12 mm point results in about a 10% reduction in electric power consumption $b$, about a 7% decrease in the change-over time $c$ and about a 10% reduction in any energy consumption $d$. Further, by reducing the stroke, the temperature rise in the solenoid 5 is limited which has an appreciable effect in extending the life of the valve and in increasing its durability to withstand frequent use under hard working conditions. Moreover, by shortening the stroke, the extent of impact can be reduced which affords an additional elongation of the valve's service life.

DETAILED DESCRIPTION OF THE PREFERRED EMBODIMENT

The essential feature of the present invention resides in that each valving hole, whether it is rounded or slot-shaped, can be formed with its dimension in the axial direction of the sleeve less than the comparable dimension of the non-valving holes and the total flow area of a row of the valving holes can be appreciably reduced relative to the total flow area of a row of the non-valving holes so that the fluid medium flow characteristic through the valve can be increased for any given spool stroke. This feature of increasing the flow area of the non-valving holes by a significant amount relative to the valving holes has not been known in the past.

Figure 8:
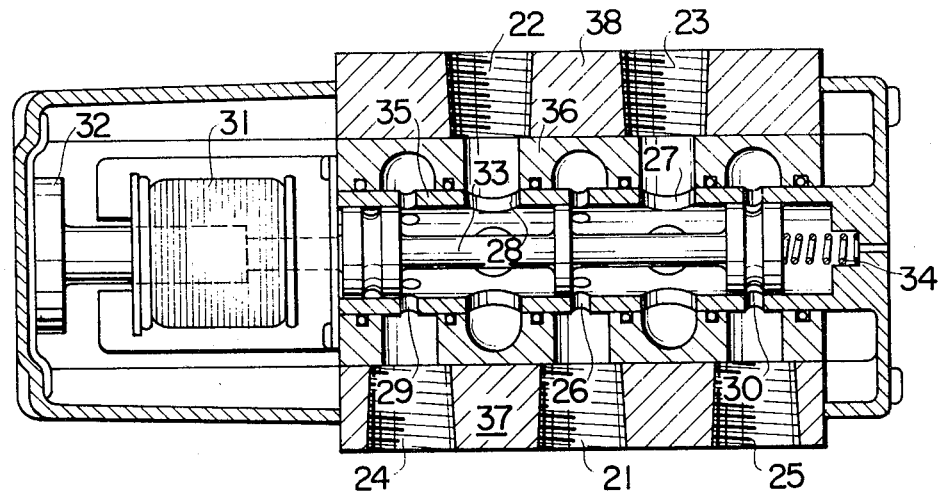
FIG. 8 is a longitudinal sectional view of a four-way electromagnetic valve embodying the present invention.
Figure 10:
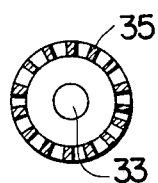
FIGS. 10 and 11 are, respectively, transverse and longitudinal sectional views of the part shown in FIG. 9.
Figure 9:
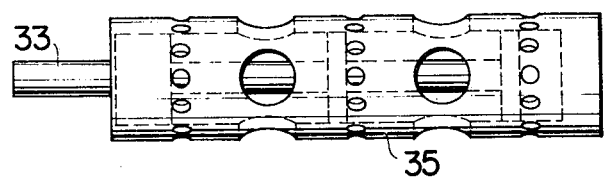
FIG. 9 is an elevational view of a portion of the change-over mechanism of FIG. 8.
Figure 11:
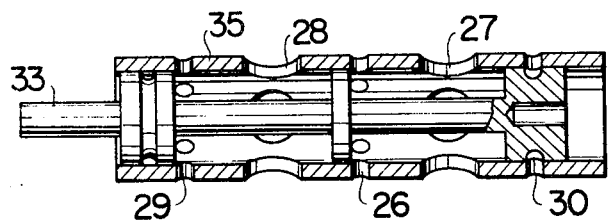

In FIG. 8, an electromagnetic change-over valve, in accordance with the present invention, is illustrated. The fluid medium enters the valve through a fluid supply port 21 formed in a side-plate 37, it passes through circular valving holes 26 and then out through circular non-valving holes 27 in sleeve 35 mounted in a valve body portion 36 and, from the non-valving holes 27, the fluid flows out through a port 23 formed in another side-plate 38. On the other hand, owing to the fluid pressure, fluid in a port 22 in the side plate 38 flows through circular non-valving holes 28 and valving holes 29 in sleeve 35 and passes outwardly through a port 24 in the side-plate 37. Change-over of the flow direction of the fluid is accomplished by supplying an electric current to a coil 31 to energize it and attract a plunger 32 which forces the spool 33 to move to another position against the biasing force of a spring 34. In this new position, that is, with the spool 33 moved in the rightward direction as compared to that shown in FIG. 8, fluid in the port 21 flows into the sleeve through the circular valving holes 26 and out through the circular non-valving holes 28 into the port 22 and, at the same time, the fluid in port 23 flows through the non-valving holes 27 and then through the valving holes 30 into the port 25. When the supply of electric current to the coil is cut off, the coil is de-energized and, as a result, the plunger 32 and spool 33 are returned, by the biasing force of the spring 34, to the original position shown in FIG. 8. As shown in the drawings, the spool 33 has a valving land for each of the valving holes 26, 29, and 30 of about the same length axially of the spool as the valving holes.

In general, the life of an electromagnetic change-over valve of the type discussed above is greatly influenced by the quality of the individual component parts or units and the stroke of the movable portion. Therefore, if this stroke could be shortened, electrical and mechanical wear of the solenoid will be reduced to elongate its life and also to improve its durability to withstand frequent use, and, furthermore, fatigue failure of the spring will be minimized thus affording elongation of the life of the valve. Similarly, by maintaining the length of the spool stroke and the total area of the valving holes the same and enlarging the area of the non-valving holes significantly, the ability of the valve to flow air can be notably improved. Accordingly, the size of such a change-over valve can be significantly reduced for a given air flow or the air flow of a given valve can be appreciably increased.

For a given total cross-sectional area the dimension of the valving holes in the axial direction of the spool is made as small as possible to minimize the stroke and, at the same time, the total cross-sectional area of each row of non-valving holes is made significantly greater than the total cross-sectional area of each row of valving holes. By this variation in the total cross-sectional area of the non-valving holes as compared to the valving holes, a dramatic increase in the ability of the valve to flow air or another fluid medium is achieved as compared to the conventional arrangements where the total cross-sectional area of the non-valving holes is the same as that of the valving holes. though the ability to flow the fluid medium through the valve is increased, the increase is achieved without any change in the length of the stroke so that the advantages of a smaller stroke are retained.

As exemplary of the present invention, the following examples illustrate the difference in dimension of the valving and non-valving holes and also the difference in the total cross-sectional flow area of each row of valving holes as compared to each row of non-valving holes.

| EXAMPLES | | |
|---|---|---|
| Rows of | No. and Diameter (mm) | Total Cross-Sectional Area (mm$^2$) |
| A. | | |
| VALVING HOLES | 16 at 2 | 49.9 |
| NON-VALVING HOLES | 8 at 5 | 156.0 |
| B. | | |
| VALVING HOLES | 16 at 2.5 | 77.9 |
| NON-VALVING HOLES | 4 at 8 | 199.7 |
| C. | | |
| VALVING HOLES | 12 at 4.2 | 165.0 |
| NON-VALVING HOLES | 8 at 6 | 224.6 |

In the above examples the distance travelled by the spool is limited by the axial dimension of the valving holes, for example in "A" the travel would be at least 2 mm while in "C" it would be at least 4.2 mm. However, in these two examples the comparable axial dimensions of the non-valving holes are 5 mm and 6 mm. Further, the range difference in the total cross sectional area of the rows of holes can vary between 25% for "C" and 70% for "A".

Thus, unlike the conventional change-over valves where the valving and non-valving holes in the sleeve were all of the same diameter and the total cross-sectional flow area of each row of holes was the same, and the minimum spool stroke was limited by the effective cross-sectional area of the holes, in the present invention it is possible to limit the size of the holes which determine the length of the spool stroke while increasing the size of the holes which have no direct relationship on the stroke so that the total effective air flow through the valve can be increased. In this way the air flow through a change-over valve can be very significantly increased without any appreciable change in the overall size of the valve. Moreover, the present invention can also be used where the valving holes are of an elongated slot-like shape rather than being round. furthermore, the present invention can be used not only in direct-acting spool-sleeve type electromagnetic valves, but also in pilot type magnet valves or air valves.

While a specific embodiment of the invention has been shown and described in detail to illustrate the application of the inventive principles, it will be understood that the invention may be embodied otherwise without departing from such principles.

What is claimed is:

1. A spool-sleeve type valve including an axially elongated sleeve having a plurality of annular rows of holes extending therethrough, a spool located within and being displaceable through said sleeve in the axial direction thereof, said spool having spaced apart lands on its outer surface with the dimension of each of said lands in the axial direction of said sleeve at least equal to the axial dimension of a corresponding one of said rows of holes and being displaceable across said ones of said rows of holes from one side to the other thereof for varying the direction of flow between adjacent pairs of said rows of holes, said rows of holes including rows of first holes and rows of second holes alternating with said rows of first holes with the lands on the outer surface of said spool being displaceable across said rows of first holes from one side to the other, said holes in said rows of first holes having a smaller dimension in the axial direction of said sleeve than said holes in said row of second holes and the total flow area of the holes in each of said row of first holes traversed by said land on said spool being at least 25% smaller than the total flow area of the holes in the adjacent said rows of second holes.

2. A spool-sleeve type valve, as set forth in claim 1, wherein the total flow area of the holes in said row of first holes traversed by said land on said spool being in the range of 25% to 70% smaller than the total flow area of the hole in adjacent said rows of second holes.

3. A spool-sleeve type valve as set forth in claim 1, wherein the total flow area of the holes in said row of first holes traversed by said land on said spool being in the ratio of approximately one to three with the total flow area of the holes in the adjacent said rows of second holes.

4. A spool-sleeve type valve, as set forth in claim 1, wherein said holes in said row of first holes having a rectangular-shaped configuration elongated in the direction transverse to the axial direction of said sleeve.

5. A spool-sleeve type valve, as set forth in claim 1, wherein said holes in said row of first holes having an oval-shaped configuration elongated in the direction transverse to the axial direction of said sleeve.

* * * * *